May 15, 1928. 1,669,693

H. CLAAR

LIME SPREADING ATTACHMENT FOR MANURE SPREADERS

Filed March 26, 1924

Inventor.
Harry Claar,
By Sprinkle & Smith
Attys.

Patented May 15, 1928.

1,669,693

UNITED STATES PATENT OFFICE.

HARRY CLAAR, OF WATSON, ILLINOIS, ASSIGNOR, BY DIRECT AND MESNE ASSIGNMENTS, TO DEERE & COMPANY, OF MOLINE, ILLINOIS, A CORPORATION OF ILLINOIS.

LIME-SPREADING ATTACHMENT FOR MANURE SPREADERS.

Application filed March 26, 1924. Serial No. 701,949.

This invention relates to a manure spreading attachment.

One of the objects of the present invention is to provide a manure spreading attachment which is adapted to convert the ordinary manure spreader into an efficient lime, sand or pulverized fertilizer spreader.

A further object of the invention is to provide a simple and easily detachable device which can be readily attached to or detached from the ordinary manure spreader.

A further object of the invention is to provide a receptacle or pan positioned at the delivery end of the apron of the spreader and beneath the beater for preventing the loss of the material being spread between these parts.

These and other objects are accomplished by providing a construction and arrangement of the various parts in the manner hereinafter described and particularly pointed out in the appended claims.

Referring to the drawings, Fig. 1 is a cross sectional view of a portion of a manure spreader showing my improved attachment mounted therein.

Figure 1:
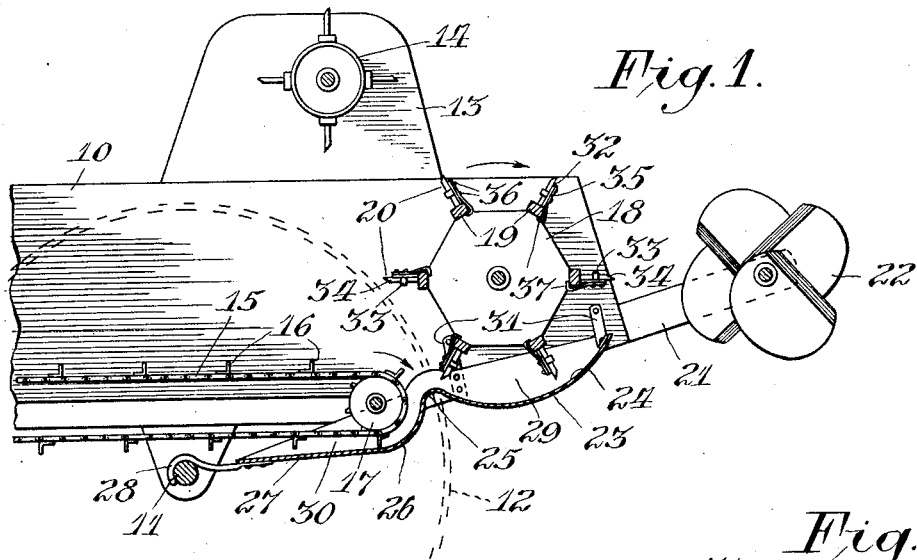
Figure 2:
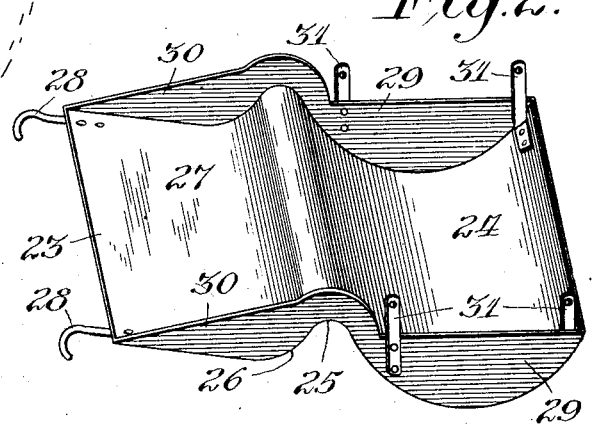
Fig. 2 is a perspective view of the detachable pan or receptacle.

In carrying out my invention I have provided an improved form of an attachment for a manure spreader which is adapted for use in connection with spreading materials that are in pulverized form. In connection with distributing and spreading materials that are in powdered or pulverized form the ordinary manure spreader is so constructed that the beater which is positioned to the rear and adjacent the delivery end of the apron in such a manner that any pulverized material being distributed by the ordinary manure spreader drops down between the beater and the end of the apron and does not give the desired spread over a wide area that is required.

For the purpose of illustration I have shown a manure spreader comprising a body 10 mounted on the usual supporting axle 11 and carrying wheels 12. Secured to the sides of the body 10 and extending upwardly therefrom are extension members 13 which form bearings for the usual rotating retarder 14. Operatively mounted in the bottom of the body or box 10 is the usual endless belt conveyor 15, which is provided with a plurality of lugs 16 for engaging and carrying the material in the manure spreader rearwardly toward the delivery end thereof. The endless conveyor belt 15 is operatively driven by a driving roller 17, which is geared to the carrying or traction wheels 12 in a manner well known. Rotatably mounted in bearings formed in the sides of the body 10 above and to the rear of the delivery end of the endless conveyor belt 15 is the usual beater 18. The beater 18 is provided with the usual cross bars 19 which in turn are provided with radially projecting teeth 20. The beater 18 together with the radially projecting teeth 20 are positioned with respect to the delivery end of the endless conveyor belt 15 in such a manner as to form a relatively small space between the lug 16 of the conveyor belt and the teeth 20 of the beater, to positively insure or prevent either of these members or parts from striking each other in their normal operation. Positioned to the rear of the beater 18 and mounted on arms 21 secured to the body 10 of the manure spreader is the usual wide spread distributor 22. The wide spread distributor 22 is so positioned that as the material to be distributed is conveyed by the beater over the top thereof in the direction indicated by the arrow it is delivered to the wide spread distributor and spread over a wide area or swath. The wide spreader 22 and beater 18 as well as the rotating retarder 14 is operatively geared to the traction or carrying wheels 12 in the manner well known and for this reason it is thought unnecessary to specifically describe the manner in which all these parts are operatively driven.

A novel feature of my improved lime spreading attachment comprises a detachable pan 23 which has its rearward portion curved concentrically as shown at 24 in a manner to conform with the curvature or path defined by the rotating teeth 20 of the beater 18. At a point between the beater 18 and the delivery end of the endless conveyor 15 the pan 23 deflects downwardly as shown at 25 and curves under the driving roller 17 of the endless conveyor 15 as shown at 26 and extends forwardly as shown at 27 to a point adjacent the axle 11. The extension is provided on the opposite sides thereof with hooks 28 which are adapted to be detachably supported on the axle 11 for supporting the pan at its forward end beneath the lower ply of the conveyor belt or apron. The pan 23 is preferably made of a single piece of sheet metal and is provided with oppositely disposed sides 29 adjacent the curved portion 24 so as to form substantially a receptacle for receiving any loose material that may be dropped between the apron or conveyor belt and the beater. The sides 29 extend forwardly and taper downwardly as shown at 30 adjacent the extension 27. The rearward end of the pan 23 is supported in close proximity to the path defined by the teeth of the beater 18 by brackets 31 which in turn are adapted to be secured to the sides of the body.

Figure 3:
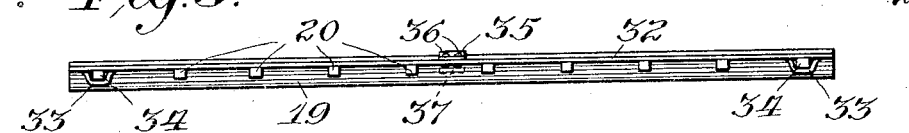
Fig. 3 is a top plan view of one of the paddles showing the manner in which it is removably secured to the teeth and bar of the beater.
Figure 4:
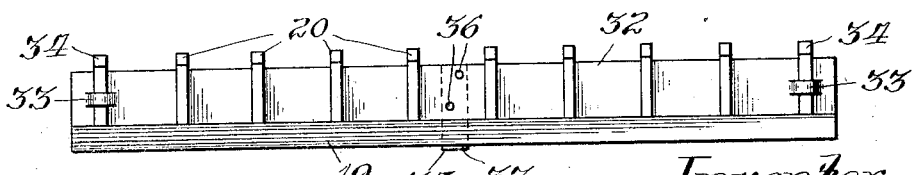
Fig. 4 is a front elevational view of the paddles shown in Fig. 3.

From the above description it will be readily seen that as the lime or other pulverized material being distributed is conveyed rearwardly by the endless conveyor or apron 15 that the beater 18 will engage such material and convey it over the top thereof onto the wide distributor 22 mounted on a frame extension 21, and in the event any of the material should drop between the delivery end of the apron and the conveyor it will fall into the receptacle 24 where it will be picked up as soon as a sufficient quantity is accumulated by the rotating beater and conveyed over the top of the beater without any loss. Another novel feature that I have provided in connection with my improved lime spreading attachment is the provision of a quick detachable paddle which comprises a plurality of longitudinally extending plates 32 having staple-like portions pressed outwardly on the outer ends thereof as shown at 33, which are adapted to receive the outer teeth 34 of each row of beater teeth 20. The plates 32 are positioned parallel to the teeth and are detachably secured in position by means of spring clips 35 which are secured to the plates 32 by means of rivets 36. The spring clips 35 are provided with right angularly disposed portions 37 which are adapted to engage the inner sides of the beater bars 19 as clearly shown in Figs. 1, 3 and 4. By this construction it will readily be seen that I have provided a construction and arrangement by which an ordinary manure spreader may be readily converted into an efficient wide spread lime spreader with very little effort. By providing the paddles 32 on the rotating beater 18 it will readily be seen that as these paddles rotate through the concentrically arranged receptacle 24 which is secured in position so that the paddles rotate in close proximity with the bottom thereof in such a manner as to sweep the lime or other pulverized material as fast as it accumulates and at the same time prevent the loss of any appreciable amount of material between the delivery end of the endless conveyor and the rotating beater and affording a means whereby the wide spread of all the material is assured.

What I claim as my invention and desire to secure by Letters Patent is:

1. In a lime spreading attachment for a manure spreader, the combination of a manure spreader having a body, an axle, and supporting wheels therefor, an apron carried by said body, a beater positioned above and adjacent the delivery end of said apron, and a pan having one end detachably secured to said axle and the other end secured to said body for preventing the loss of lime between said apron and beater.

2. In a lime spreading attachment for a manure spreader, the combination of a manure spreader having a body, an axle and supporting wheels therefor, an apron for conveying the lime rearwardly in said body, a rotating beater positioned at the delivery end of said apron for delivering the lime over the top thereof, a detachable pan having a portion curved concentrically with and in close proximity to said beater, and a plurality of paddles detachably connected to said beater and adapted to sweep in the curved portion of said pan for delivering the lime from said pan over the top of said beater.

3. In a lime spreading attachment for manure spreader, the combination with a manure spreading device having a body for carrying material to be spread, an endless belt conveyor carried by the body, a rotatable beater having means thereon adapted to traverse the arcs of circles throughout the length of said beater in the rotation of the beater for engaging material to be spread, and a pan having a portion thereof curved concentrically with the outer periphery of the beater and underlying the lower periphery thereof, the forward edge of the said pan adjacent the delivery end of the apron being extended approximately into the space between the beater and the endless belt conveyor and deflected thence downwardly to a point immediately below the rearward extremity of the lower run of the apron, there being side members adjacent the ends of the beater on the said concentrically curved portion of the pan whereby the pan is adapted to receive and retain finely divided materials discharged from the apron until the same may be engaged by the beater.

4. As an article of manufacture, a detachable pan for fertilizer spreaders adapted to spread lime and analogous finely divided fertilizer materials, comprising a receptacle having the bottom portion thereof curved to conform to the circular path of travel of teeth on a rotating beater, there being side closure members for retaining in conjunction with the curved bottom portion finely divided materials within the pan, and an extension on the forward edge of the pan being formed downwardly and thence forwardly and horizontally and being adapted to underlie a substantial portion of the delivery end of the usual means for delivering fertilizer materials to the beater.

5. As an article of manufacture, a detachable pan for fertilizer spreaders adapted to spread lime and analogous finely divided fertilizer materials, comprising a receptacle having the bottom portion thereof curved to conform to the circular path of travel of teeth on a rotating beater, an extension on the forward edge of the pan being formed downwardly, thence forwardly, and being adapted to underlie a substantial portion of the delivery end of the usual means for delivering fertilizer materials to the beater, and side closure members at the sides of the pan for retaining, in conjunction with the said curved portion and the said forward extension of the pan, finely divided fertilizer materials within the pan.

In testimony whereof I have signed my name to this specification, on this 11th day of March A. D. 1924.

HARRY CLAAR.